(12) United States Patent
Song et al.

(10) Patent No.: US 10,191,323 B2
(45) Date of Patent: Jan. 29, 2019

(54) DISPLAY DEVICE

(71) Applicant: SAMSUNG DISPLAY CO., LTD., Yongin-si, Gyeonggi-do (KR)

(72) Inventors: Junho Song, Seongnam-si (KR); Seunghyun Park, Seoul (KR); Sungin Ro, Hwaseong-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 82 days.

(21) Appl. No.: 15/229,505

(22) Filed: Aug. 5, 2016

(65) Prior Publication Data

US 2017/0038644 A1 Feb. 9, 2017

(30) Foreign Application Priority Data

Aug. 5, 2015 (KR) .................. 10-2015-0110570

(51) Int. Cl.
*H01L 27/32* (2006.01)
*G02F 1/1335* (2006.01)
(Continued)

(52) U.S. Cl.
CPC ...... *G02F 1/133553* (2013.01); *G02F 1/1368* (2013.01); *G02F 1/133345* (2013.01);
(Continued)

(58) Field of Classification Search
CPC ... H01L 27/32–27/326; H01L 51/50–51/5012; H01L 51/525–51/5287; H01L 2227/32–2227/326; H01L 2251/5323–2251/5361; H01L 2924/12044; H01L 2021/775; H01L 27/1214; H01L 27/124; H01L 27/3232; H01L 51/0076; H01L 27/14603; H01L 27/14605; H01L 27/14609; H01L 27/14812; H01L 27/3248
See application file for complete search history.

(56) References Cited

U.S. PATENT DOCUMENTS 5,359,441 A    10/1994  Mori et al.
5,757,452 A *   5/1998  Masaki ............ G02F 1/133512
                                                       349/106
(Continued)

FOREIGN PATENT DOCUMENTS

KR    10-2005-0006047 A    1/2005

*Primary Examiner* — Cuong B Nguyen
*Assistant Examiner* — Samuel Park
(74) *Attorney, Agent, or Firm* — Lee & Morse, P.C.

(57) ABSTRACT

A display device includes substrate including a red pixel area, a green pixel area, a blue pixel area, and a white pixel area, a gate line and a data line on the substrate, a thin film transistor connected to each of the gate line and the data line, an insulating layer on the gate line, the data line, and the thin film transistor, the insulating layer having grooves in the red pixel area, the green pixel area, and the blue pixel area, respectively, a reflective layer on the insulating layer, the reflective layer being in the red pixel area, the green pixel area, and the blue pixel area, a color filter in each of the grooves of the insulating layer, and a transparent pixel electrode on the color filter and the insulating layer, the transparent pixel electrode being connected to the thin film transistor.

16 Claims, 5 Drawing Sheets

(51) Int. Cl.
   *G02F 1/1368*   (2006.01)
   *G02F 1/1333*   (2006.01)
   *G02F 1/1362*   (2006.01)

(52) U.S. Cl.
   CPC .............. *G02F 1/133512* (2013.01); *G02F 2001/136222* (2013.01)

(56) References Cited

U.S. PATENT DOCUMENTS

| | | |
|---|---|---|
| 7,452,604 B2 | 11/2008 | Takagi et al. |
| 7,499,116 B2 | 3/2009 | Tsai et al. |
| 7,505,053 B2 | 3/2009 | Brown et al. |
| 2007/0013839 A1* | 1/2007 | Rho .............. G02B 5/201 349/114 |

\* cited by examiner

DISPLAY DEVICE

CROSS-REFERENCE TO RELATED APPLICATION

Korean Patent Application No. 10-2015-0110570, filed on Aug. 5, 2015, in the Korean Intellectual Property Office, and entitled: "Display Device," is incorporated by reference herein in its entirety.

BACKGROUND

1. Field

Exemplary embodiments relate to a reflective display device, and more particularly, to a reflective display device that prevents light loss.

2. Description of the Related Art

Recently, display devices, e.g., liquid crystal display ("LCD") devices, electrophoretic display ("EPD") devices, and the like, are widely used in place of conventional cathode ray tubes ("CRT"). Such display devices are light-receiving-type display devices, i.e., passive-type display devices, and thus, require an additional light source. In this regard, display devices are classified into transmissive display devices which display images using a backlight unit provided therein as a light source, and reflective display devices which display images using natural light as a light source absent a backlight unit.

SUMMARY

Exemplary embodiments are directed to a reflective display device that enhances luminance and color reproducibility.

According to an exemplary embodiment, a display device includes: a substrate including a red pixel area, a green pixel area, a blue pixel area, and a white pixel area; a gate line and a data line on the substrate; a thin film transistor connected to each of the gate line and the data line; an insulating layer on the gate line, the data line, and the thin film transistor, the insulating layer having grooves in the red pixel area, the green pixel area, and the blue pixel area, respectively; a reflective layer on the insulating layer and in the red pixel area, the green pixel area, and the blue pixel area; a color filter in each of the grooves; and a transparent pixel electrode on the color filter and the insulating layer, the transparent pixel electrode being connected to the thin film transistor.

The reflective layer may be between the color filter and the insulating layer.

The display device may further include an opaque pixel electrode in the white pixel area.

The opaque pixel electrode may be spaced apart from the reflective layer.

The opaque pixel electrode and the reflective layer may include a same material.

The transparent pixel electrodes may be in the red pixel area, the green pixel area, and the blue pixel area, respectively.

The reflective layer may be in the white pixel area.

The transparent pixel electrodes may be in the red pixel area, the green pixel area, the blue pixel area, and the white pixel area, respectively.

The substrate may further include a light shielding area surrounding the red pixel area, the green pixel area, the blue pixel area, and the white pixel area, and overlapping the gate line and the data line.

The reflective layer may be in the light shielding area.

According to another exemplary embodiment, a display device includes: a substrate including a red pixel area, a green pixel area, a blue pixel area, and a white pixel area; a gate line and a data line on the substrate; a thin film transistor connected to each of the gate line and the data line; a first insulating layer on the gate line, the data line, and the thin film transistor; a second insulating layer on the first insulating layer, the second insulating layer having apertures in the red pixel area, the green pixel area, and the blue pixel area, respectively; a reflective layer on the first insulating layer and the second insulating layer and in the red pixel area, the green pixel area, and the blue pixel area; a color filter in each of the apertures; and a transparent pixel electrode on the color filter and the second insulating layer, the transparent pixel electrode being connected to the thin film transistor.

The reflective layer may be between the color filter and the first insulating layer.

The display device may further include an opaque pixel electrode in the white pixel area.

The opaque pixel electrode may be spaced apart from the reflective layer.

The opaque pixel electrode and the reflective layer may include a same material.

The transparent pixel electrodes may be in the red pixel area, the green pixel area, and the blue pixel area, respectively.

The reflective layer may be in the white pixel area.

The transparent pixel electrodes may be in the red pixel area, the green pixel area, the blue pixel area, and the white pixel area, respectively.

The substrate may further include a light shielding area surrounding the red pixel area, the green pixel area, the blue pixel area, and the white pixel area, and overlapping the gate line and the data line.

The reflective layer may be in the light shielding area.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

The spatially relative terms "below," "beneath," "lower," "above," "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe the exemplary embodiments and may be modified according to the relevant art. Therefore, the terms used herein should be interpreted as having a meaning that is consistent with their meanings in the context of the present disclosure, and is not intended to limit. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a first exemplary embodiment of a display device will be described with reference to FIGS. 1 and 2. By way of example, the display device according to the first exemplary embodiment will be described with respect to a reflective liquid crystal display ("LCD") device. Unless otherwise indicated, it is assumed that the LCD device according to the first exemplary embodiment is a reflective LCD device.

Figure 1:
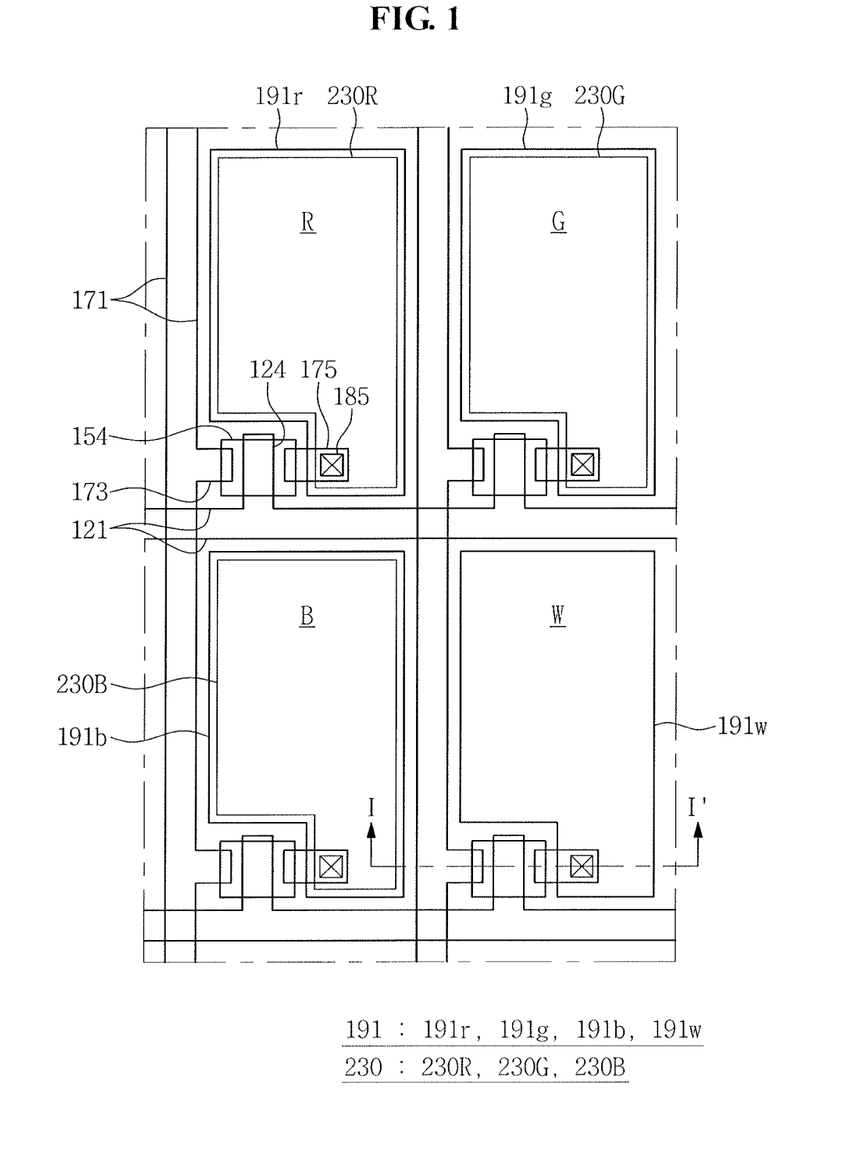
FIG. 1 illustrates a schematic plan view of a plurality of pixels according to a first exemplary embodiment.

FIG. 1 is a schematic plan view illustrating a plurality of pixels according to the first exemplary embodiment. FIG. 2 is a cross-sectional view taken along line I-I' of FIG. 1. FIG. 3 is a schematic plan view illustrating the plurality of pixels of FIG. 1 and a second insulating layer of FIG. 2.

Figure 2:
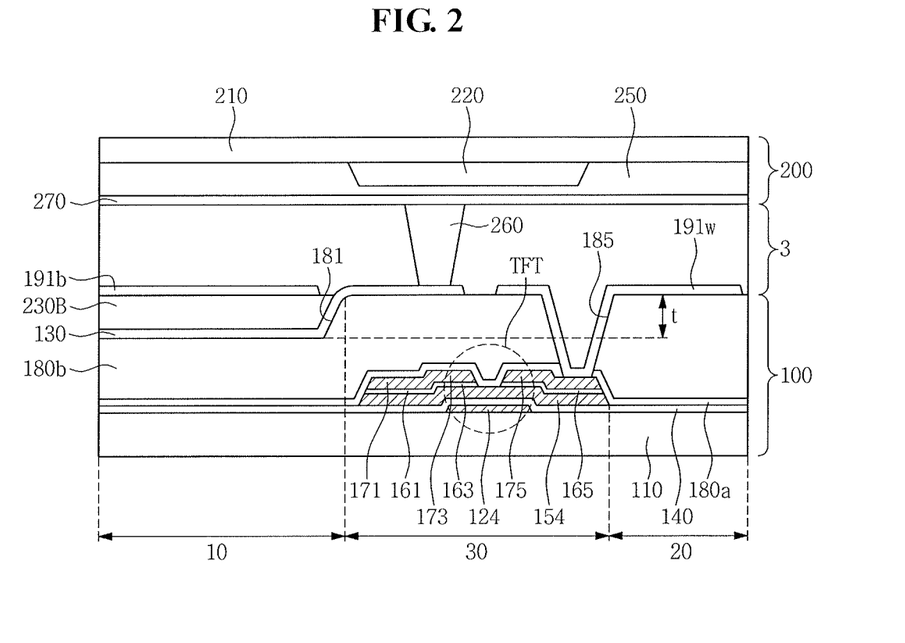
FIG. 2 illustrates a cross-sectional view taken along line I-I' of FIG. 1.
Figure 3:
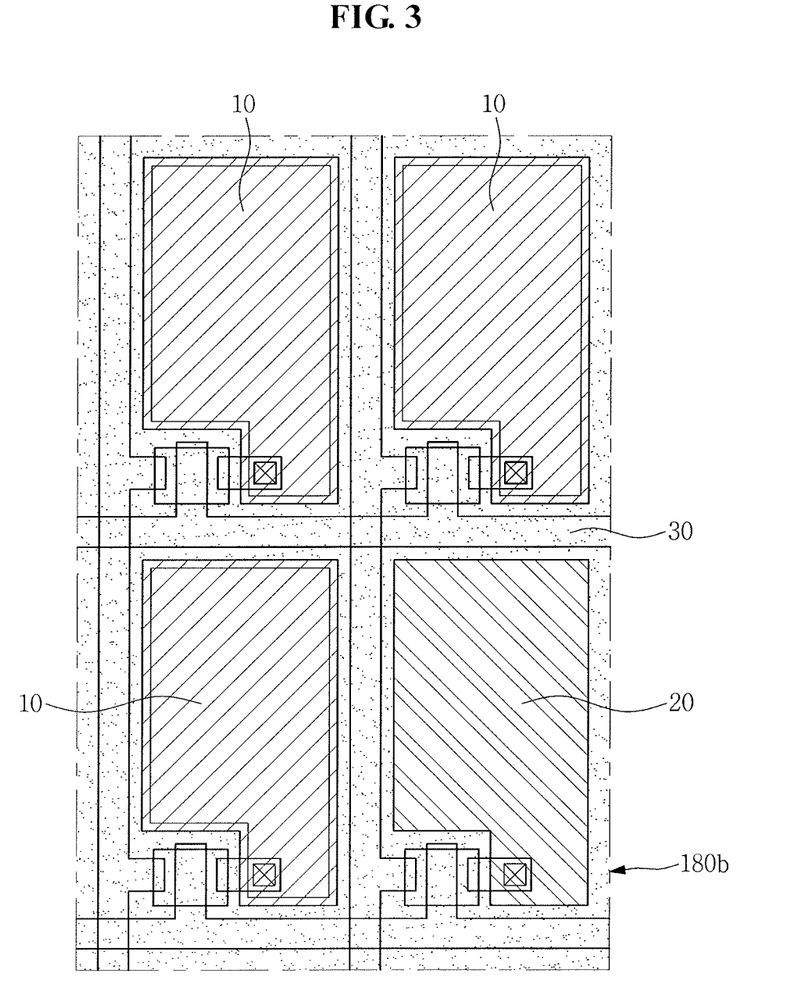
FIG. 3 illustrates a schematic plan view of the plurality of pixels of FIG. 1 and a second insulating layer of FIG. 2.

Referring to FIGS. 1-3, a LCD device according to the first exemplary embodiment may include a plurality of pixels R, G, B, and W on a first substrate 110. The plurality of pixels R, G, B, and W include a red pixel R, a green pixel G, a blue pixel B, and a white pixel W. In an exemplary embodiment, as illustrated in FIG. 1, the red pixel R, the green pixel G, the blue pixel B, and the white pixel W may be arranged in a 2×2 matrix shape to define a pixel group.

While FIG. 1 illustrates a single pixel group for ease of description, in actuality, pixel groups are arranged in a matrix shape having a plurality of rows and a plurality of columns. Since each of the pixel groups has the same structure as one another, a single pixel group will be described hereinbelow for ease of description. The pixel group is illustrated as having a 2×2 matrix shape in FIG. 1; however, the structure of the pixel group is not limited thereto. The pixel group may be modified into various shapes including such as a linear shape, a V-shape, a Z-shape, or the like.

The first substrate 110 may include a color pixel area 10, i.e., a red pixel area 10, a green pixel area 10, and a blue pixel area 10, a white pixel area 20, and a light shielding area 30 (FIG. 3). The red, green, blue, and white pixels R, G, B, and W are disposed in the red pixel area 10, the green pixel area 10, the blue pixel area 10, and the white pixel area 20, respectively. A gate line 121 and a data line 171 may be arranged in a matrix shape, and define a plurality of pixel areas, e.g., the red pixel area 10, the green pixel area 10, the blue pixel area 10, and the white pixel area 20. Hereinafter, the red pixel area 10, the green pixel area 10, and the blue pixel area 10 are collectively referred to as the color pixel area 10 for ease of description.

As illustrated in FIG. 3, three color pixel areas 10 and the white pixel area 20 may be arranged in the 2×2 matrix shape to define the pixel group. The light shielding area 30 may surround, e.g., each of, the color pixel areas 10 and the white pixel area 20, and may overlap the gate line 121 and the data line 171.

A pixel electrode 191 may be disposed in each of the color pixel areas 10 and the white pixel area 20. Transparent pixel electrodes 191$r$, 191$g$, and 191$b$ including transparent conductive electrodes are disposed in the color pixel areas 10, respectively. An opaque pixel electrode 191$w$ including metal which has relatively high reflectivity is disposed in the white pixel area 20. The opaque pixel electrode 191$w$ serves both as a reflective electrode and as a pixel electrode. A thin film transistor ("TFT") is disposed at an intersection area between the gate line 121 and the data line 171, and adjusts the level of voltage applied to the pixel electrode 191. Meanwhile, a reflective layer 130 is disposed over substantially an entire surface of the first substrate 110, except for the white pixel area 20 and a contact hole 185 through which a drain electrode 175 is exposed.

The LCD device configured in the above-described manner operates as a reflective display device. In the LCD device, natural light or ambient light incident thereto is reflected off the reflective layer 130 and the opaque pixel electrode 191$w$ to be transmitted through a liquid crystal layer 3, whereby an image is displayed. Respective components included in the LCD device will be described in greater detail hereinbelow.

Referring to FIG. 2, the LCD device may include a lower display panel 100 and an upper display panel 200 facing one another. The liquid crystal layer 3 may be interposed between the lower and upper display panels 100 and 200.

The plurality of gate lines 121 may be disposed on the first substrate 110. The gate lines 121 transmit gate signals and extend substantially in a transverse direction. Each of the gate lines 121 includes a plurality of gate electrodes 124.

A gate insulating layer 140 may be disposed on the gate line 121, e.g., on the gate electrode 124 (FIG. 2). The gate insulating layer 140 may include an inorganic insulating material, e.g., silicon nitride ($SiN_x$) or silicon oxide ($SiO_x$).

A plurality of semiconductors 154 may be disposed on the gate insulating layer 140. Each of the plurality of semiconductors 154 may include a protrusion extending along the gate electrode 124, e.g., a portion of the semiconductor 154 overlapping the gate electrode 124 may be at a higher level than other portions of the semiconductor 154. In an alternative exemplary embodiment, the semiconductor 154 may only be disposed on the gate electrode 124, e.g., the semiconductor 154 may have a flat structure overlapping only the gate electrode 124. The semiconductor 154 may include, e.g., amorphous silicon, polycrystalline silicon, or an oxide semiconductor.

If the semiconductor 154 is an oxide semiconductor, the oxide semiconductor may include at least one of, e.g., zinc (Zn), gallium (Ga), indium (In), and tin (Sn). For example, the oxide semiconductor may include an oxide semiconductor material such as oxide based on, e.g., Zn, Ga, Sn, or In, or composite oxide, e.g., zinc oxide (ZnO), indium-gallium-zinc oxide ($InGaZnO_4$), indium-zinc oxide (In—Zn—O), or zinc-tin oxide (Zn—Sn—O). In detail, the oxide semiconductor may include, e.g., IGZO-based oxide including In, Ga, Zn, and oxygen (O). In addition, the oxide semiconductor may include In—Sn—Zn—O based metal oxide, In—Al—Zn—O based metal oxide, Sn—Ga—Zn—O based metal oxide, Al—Ga—Zn—O based metal oxide, Sn—Al—Zn—O based metal oxide, In—Zn—O based metal oxide, Sn—Zn—O based metal oxide, Al—Zn—O based metal oxide, In—O based metal oxide, Sn—O based metal oxide, and Zn—O based metal oxide.

A plurality of ohmic contact members 161, 163 and 165 may be disposed on the semiconductor 154 and the protrusion of the semiconductor 154. The ohmic contact members 161, 163 and 165 may be disposed on the semiconductor 154, in pairs that face one another based on the gate electrode 124. The ohmic contact members 161, 163 and 165 may include, e.g., silicide, or n+ hydrogenated amorphous silicon doped with n-type impurities at high concentration such as phosphorus.

A data conductor including the plurality of data lines 171 and the plurality of drain electrodes 175 may be disposed on the ohmic contact members 161, 163, and 165. The data line 171 transmits a data signal and extends substantially in a longitudinal direction to intersect the gate line 121. Each data line 171 may include a plurality of source electrodes 173 extending toward the gate electrode 124. The drain electrode 175 may include one end portion having a bar shape and facing the source electrode 173 and another end portion having a relatively wide planar area, based on the gate electrode 124.

The gate electrode 124, the source electrode 173, and the drain electrode 175, along with the semiconductor 154, form the TFT. The semiconductor 154 may have the same planar shape as a planar shape of the data line 171, the drain electrode 175, and the ohmic contact members 161, 163, and 165 below the data line 171 and the drain electrode 175.

A first insulating layer 180a may be disposed on the data conductor, e.g., on the data line 171 and the data electrode 175 and on an exposed portion of the semiconductor 154. The first insulating layer 180a may include an organic insulating material or an inorganic insulating material. In an alternative exemplary embodiment, the first insulating layer 180a may be omitted.

A second insulating layer 180b may be disposed on the first insulating layer 180a. The second insulating layer 180b may include an organic material. The second insulating layer 180b may be disposed on the gate line 121, the data line 171, and the TFT. The second insulating layer 180b may have a groove 181 in the color pixel area 10. Accordingly, a height of a portion of the second insulating layer 180b in each of the white pixel area 20 and the light shielding area 30 may be greater than a height of a portion of the second insulating layer 180b in the color pixel area 10. For example, as illustrated in FIG. 2, a height of a topmost surface of the second insulating layer 180b in each of the white pixel area 20 and the light shielding area 30 relatively to a bottom of the first substrate 110 may be greater than a height of a topmost surface of the second insulating layer 180b in the color pixel area 10 relatively to the bottom of the first substrate 110.

The reflective layer 130 is disposed, e.g., directly, on the second insulating layer 180b in the color pixel area 10, e.g., in each of the re, blue, and green pixel areas. In addition, the reflective layer 130 is disposed, e.g., at least partially, in the light shielding area 30 so as to enhance the reflectivity of ambient light. The reflective layer 130 is disposed between a color filter 230 and the second insulating layer 180b in the color pixel area 10. For example, the reflective layer 130 is substantially disposed, e.g., continuously, over an entire surface of the first substrate 110, except for the white pixel area 20 and the contact hole 185 through which the drain electrode 175 is exposed. The reflective layer 130 may include a reflective metal, e.g., aluminum (Al), silver (Ag), chromium (Cr), or an alloy thereof.

The reflective layer 130 reflects external light incident thereon without being connected to a signal line, e.g., without being connected to the gate line 121 or the data line 171. For example, the reflective layer 130 may have an unevenness on a surface thereof so as to enhance the reflection efficiency of externally incident light.

The color filter 230 may be disposed in the groove 181 of the second insulating layer 180b. In an exemplary embodiment, the color filter 230 may include a red color filter 230R, a green color filter 230G, and a blue color filter 230B that respectively overlap corresponding ones of the color pixel areas 10. In an alternative exemplary embodiment, each of the color filters 230R, 230G, and 230B may emit light having one of a plurality of primary colors. The primary colors may include, e.g., the colors of red, green, and blue or the colors of yellow, cyan, and magenta. The color filters 230R, 230G, and 230B may include an organic material.

The pixel electrode 191 is disposed on the color filter 230 and the second insulating layer 180b. The pixel electrode 191 is electrically connected to the drain electrode 175 through the contact hole 185 so as to receive a data voltage. The pixel electrode 191 which receives the data voltage generates an electric field in the liquid crystal layer 3, along with a common electrode 270 which receives a common voltage. The pixel electrode 191 includes the transparent pixel electrodes 191r, 191g, and 191b respectively disposed in corresponding ones of the color pixel areas 10, and the opaque pixel electrode 191w disposed in the white pixel area 20.

For example, each of the color filters 230R, 230G, and 230B may be between the reflective layer 130 and a respective transparent pixel electrode 191r, 191g, and 191b. The transparent pixel electrodes 191r, 191g, and 191b may include a transparent conductive material, e.g., indium-tin oxide ("ITO") or indium-zinc oxide ("IZO").

The opaque pixel electrode 191w is disposed on the second insulating layer 180b in the white pixel area 20, and receives the data voltage which drives the white pixel W from the drain electrode 175. The opaque pixel electrode 191w is spaced apart from the reflective layer 130, e.g., outer most edges of the opaque pixel electrode 191w and the reflective layer 130 may face each other and be spaced apart from each other along a horizontal direction on the second insulating layer 180b. In such an embodiment, the opaque pixel electrode 191w and the reflective layer 130 include the same material.

A support member 260 may be disposed in the light shielding area 30. The support member 260 corresponds to a main column spacer that supports the first substrate 110 and a second substrate 210. The support member 260 may overlap a light shielding member 220.

As a white color photoresist is omitted in the white pixel area 20 and the height of the portion of the second insulating layer 180b in the white pixel area 20 is greater than a height of another portion of the second insulating layer 180b (in the color pixel areas 10), light loss in the LCD device may be reduced or effectively prevented. In general, a reflective layer is disposed below a white color photoresist, such that light loss occurs due to the white color photoresist. However, in exemplary embodiments, the white color photoresist is omitted, and thus, light loss may be reduced. With the reduced light loss, the LCD device may be enhanced in regard to the luminance thereof.

As the white color photoresist is omitted, color crosstalk (i.e., color interference) between a white color and non-white colors of red, green, blue, and the like, is reduced such that color reproducibility is enhanced. Accordingly, the LCD device may be enhanced in regard to the luminance and color reproducibility thereof.

In an exemplary embodiment, the reflective layer 130 and the opaque pixel electrode 191w are disposed immediately on the second insulating layer 180b, and thus, the LCD device may reduce light loss due to the second insulating layer 180b and may prevent a yellowing phenomenon of ambient light. This is because there may be cases in which light incident to the second insulating layer 180b may be partially lost and light that has been transmitted through the second insulating layer 180b may turn into a yellowish color (i.e., yellowed) as the organic material included in the second insulating layer 180b generally includes a yellow material.

Further, in exemplary embodiments, as the white color photoresist is omitted, the number of mask processes and manufacturing costs are reduced. In such an embodiment, as the reflective layer 130 and the opaque pixel electrode 191w are brought closer to the liquid crystal layer 3 than in a conventional display device, a color mixing phenomenon may be prevented, and as the reflective layer 130 and the opaque pixel electrode 191w are brought closer to the second substrate 210, image flicker may be prevented.

The upper display panel 200 will be provided hereinbelow with reference to FIG. 2. Referring to FIG. 2, the upper display panel 200 may include the light shielding member 220 on the second substrate 210, and an overcoat layer 250 covering the light shielding member 220.

In detail, the light shielding member 220, serving as a black matrix, is disposed on portions of the second substrate 210 corresponding to the gate line 121, the data line 171, and the TFT. The light shielding member 220 reduces or effectively prevents light leakage. For example, the light shielding member 220 may have a plurality of apertures, so each of the apertures faces the pixel electrode 191 and has substantially the same shape as that of the pixel electrode 191. In another example, the light shielding member 220 may include a first portion corresponding to the gate line 121 and the data line 171, and a second portion corresponding to the TFT.

The overcoat layer 250 is disposed on the light shielding member 220 to prevent the exposure of the light shielding member 220 and provide a planarized surface. In an alternative exemplary embodiment, the overcoat layer 250 may be omitted.

The common electrode 270 is disposed on the overcoat layer 250. The common electrode 270 may include a transparent conductive material, e.g., ITO or IZO. The common electrode 270 may have a planar shape, and may be provided, e.g., as a whole plate that extends over substantially an entire surface of the second substrate 210.

Alignment layers may be disposed on inner surfaces of the lower and upper display panels 100 and 200, respectively. Polarizers may be disposed on outer surfaces of the lower and upper display panels 100 and 200, respectively. Respective polarization axes of the two polarizers are perpendicular or parallel to one another. In the case of the reflective LCD device, one of the two polarizers may be omitted.

The liquid crystal layer 3 between the lower and upper display panels 100 and 200 includes liquid crystal molecules. Each of the liquid crystal molecules may have a major axis that is aligned to be parallel to respective surfaces of the lower and upper display panels 100 and 200 in a state in which an electric field is not generated in the liquid crystal layer 3. The liquid crystal layer 3 may have positive dielectric anisotropy or negative dielectric anisotropy. Each of the liquid crystal molecules of the liquid crystal layer 3 may be aligned to have a pretilt in a predetermined orientation, and the orientation of the liquid crystal molecules may vary based on the dielectric anisotropy of the liquid crystal layer 3.

The pixel electrode 191 to which the data voltage is applied, along with the common electrode 270 to which the common voltage is applied, generates an electric field in the liquid crystal layer 3. The electric field in the liquid crystal layer 3 determines the orientation of the liquid crystal molecules to display a corresponding image.

Hereinafter, a second exemplary embodiment of an LCD device will be described with reference to FIG. 4. Descriptions of the same components as those described in the first exemplary embodiment will be omitted herein for ease of description and conciseness.

Figure 4:
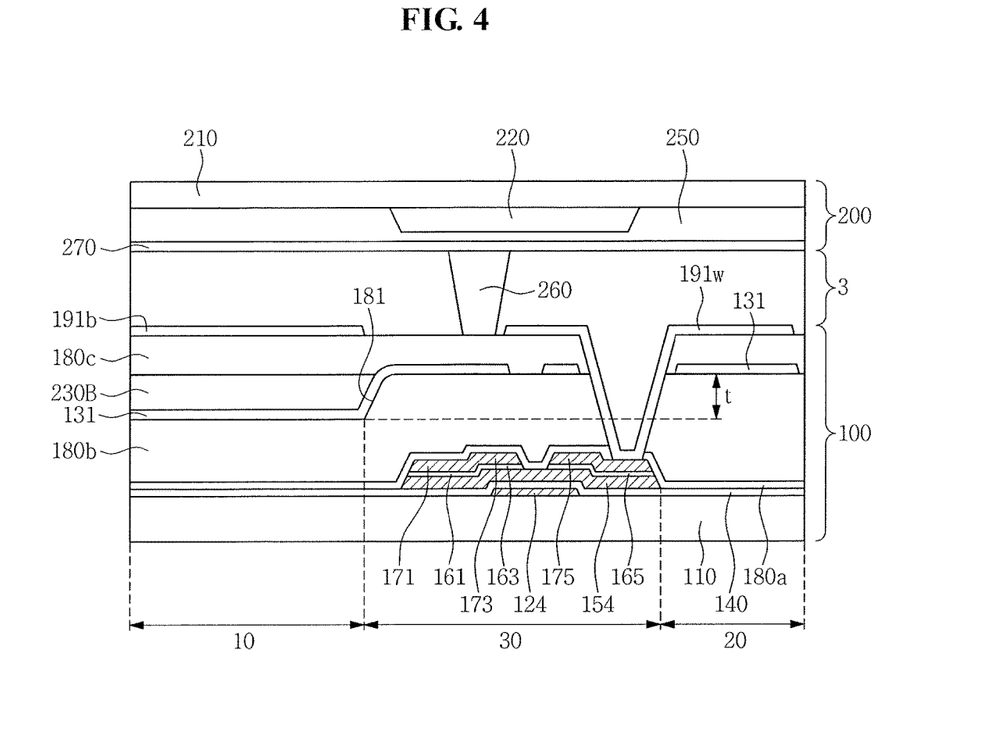
FIG. 4 illustrates a schematic cross-sectional view of a display device according to a second exemplary embodiment.

FIG. 4 is a schematic cross-sectional view illustrating the display device according to the second exemplary embodiment.

Referring to FIGS. 1 and 4, a reflective layer 131 is disposed on a second insulating layer 180b and in the white pixel area 20.

A third insulating layer 180c may be disposed on the reflective layer 131 and the color filter 230. The third insulating layer 180c may be an inorganic insulating layer, and may prevent components of the color filter 230 from being exposed externally, or may reduce or effectively prevent the deformation or discoloration of the color filter 230.

The pixel electrode 191w disposed in the white pixel area 20 includes a transparent conductive electrode, in a manner dissimilar to that of the first exemplary embodiment. In the second exemplary embodiment, the transparent pixel electrodes 191r, 191g, and 191b are respectively disposed in corresponding ones of the color pixel areas 10, and the transparent pixel electrode 191w is disposed in the white pixel area 20.

With the configuration of the LCD device as described hereinabove, light loss may be reduced or effectively prevented in the LCD device as compared to a conventional display device.

Hereinafter, a third exemplary embodiment of an LCD device will be described with reference to FIG. 5. Descriptions of the same configurations as those described in the first exemplary embodiment will be omitted herein for ease of description and conciseness.

Figure 5:
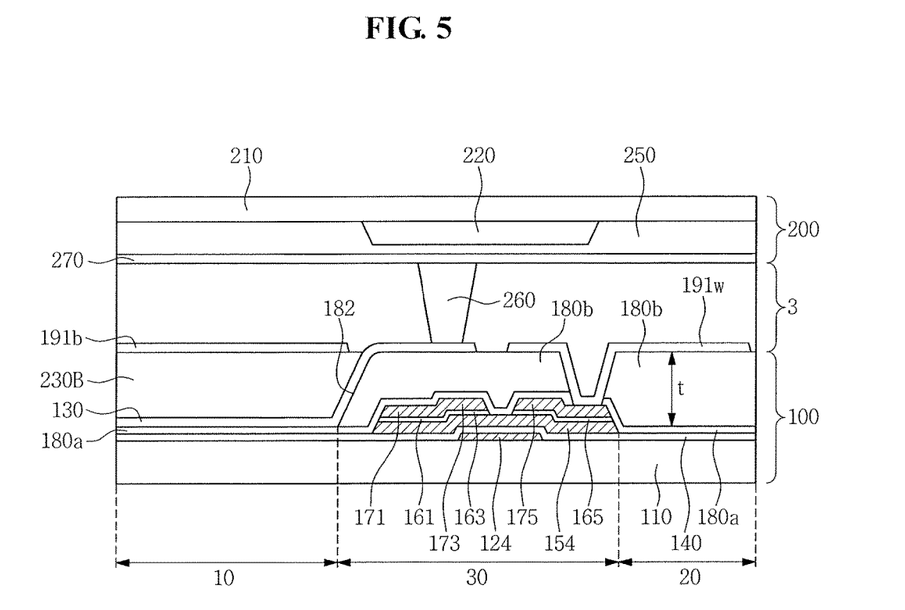
FIG. 5 illustrates a schematic cross-sectional view of a display device according to a third exemplary embodiment.

FIG. 5 is a schematic cross-sectional view illustrating the display device according to the third exemplary embodiment.

Referring to FIGS. 1 and 5, the display device according to the third exemplary embodiment may include the first substrate 110 with the color pixel area 10 and the white pixel area 20, the gate line 121 and the data line 171 disposed on the first substrate 110, the TFT connected to each of the gate line 121 and the data line 171, the first insulating layer 180a disposed on the gate line 121, the data line 171, and the TFT, the second insulating layer 180b disposed on the first insulating layer 180a and having an aperture 182 in the color pixel area 10, the reflective layer 130 disposed on the first insulating layer 180a and the second insulating layer 180b and in the color pixel area 10, the color filter 230 disposed in the aperture 182, and the transparent pixel electrodes 191r, 191g, and 191b disposed on the color filter 230 and the second insulating layer 180b and connected to the TFT. In such an embodiment, the opaque pixel electrode 191w is disposed in the white pixel area 20 while being spaced apart from the reflective layer 130.

In the display device according to the third exemplary embodiment, the second insulating layer 180b has the aperture 182 in the color pixel area 10, in a manner dissimilar to that of the first exemplary embodiment. That is, as illustrated in FIG. 5, the aperture 182 of the second insulating layer 180b extends to expose the first insulating layer 180a, so the reflective layer 130 is, e.g., directly, on the first insulating layer 180a. The color filter 230 is disposed in the aperture 182 on the reflective layer 130. As such, the LCD device according to the third exemplary embodiment has the same configuration and effects as those described in the first exemplary embodiment, except for the omission of the second insulating layer 180b in the color pixel area 10.

By way of summation and review, reflective display devices having a four-color pixel structure are presently being manufactured, as the four-color pixel structure may enhance luminance and resolution by adding a white pixel to a three-color pixel structure including red, green, and blue pixels. However, in the case of the reflective display device, the reflectivity of ambient light and color reproducibility decrease due to a color photoresist in the white pixel.

In contrast, according to one or more exemplary embodiments, a color photoresist is omitted in the white pixel area of the reflective display device, and a reflective layer or an opaque pixel electrode is disposed. As such, reflectivity decrease of ambient light may be prevented and luminance may be enhanced.

In detail, the reflective layer is disposed on the insulating layer, and thus, light loss caused by the insulating layer may be reduced or effectively prevented, the yellowing phenomenon of ambient light may be reduced or effectively prevented, and color reproducibility may be enhanced. Further, the white color photoresist is omitted, such that the number of mask processes and manufacturing costs may be reduced. Finally, as the reflective layer is brought closer to the liquid crystal layer than in a conventional display device, a color mixing phenomenon may be reduced or effectively prevented, and as the reflective layer is brought closer to an upper substrate (i.e., the second substrate) than in the conventional display device, image flicker may be reduced or effectively prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a substrate including a red pixel area, a green pixel area, a blue pixel area, and a white pixel area;
a gate line and a data line on the substrate;
a thin film transistor connected to each of the gate line and the data line;
an insulating layer on the gate line, the data line, and the thin film transistor, the insulating layer having grooves in the red pixel area, the green pixel area, and the blue pixel area, respectively;
a reflective layer on the insulating layer and covering bottoms of the grooves, the reflective layer being in the red pixel area, the green pixel area, and the blue pixel area;
a color filter in each of the grooves of the insulating layer;
a transparent pixel electrode on the color filter and the insulating layer, the transparent pixel electrode being connected to the thin film transistor; and an opaque pixel electrode in the white pixel area,
wherein a height of a portion of the insulating layer in the white pixel area is greater than a height of a portion of the insulating layer in the red pixel area, the green pixel area, and the blue pixel area.

2. The display device as claimed in claim 1, wherein the reflective layer is between the color filter and the insulating layer.

3. The display device as claimed in claim 1, wherein the opaque pixel electrode is spaced apart from the reflective layer.

4. The display device as claimed in claim 3, wherein the opaque pixel electrode and the reflective layer include a same material.

5. The display device as claimed in claim 4, wherein the transparent pixel electrode includes a transparent pixel electrode in each of the red pixel area, the green pixel area, and the blue pixel area, respectively.

6. The display device as claimed in claim 2, wherein the reflective layer is in the white pixel area.

7. The display device as claimed in claim 2, wherein the substrate further includes a light shielding area surrounding the red pixel area, the green pixel area, the blue pixel area, and the white pixel area, and overlapping the gate line and the data line.

8. The display device as claimed in claim 7, wherein the reflective layer is in the light shielding area.

9. A display device, comprising:
a substrate including a red pixel area, a green pixel area, a blue pixel area, and a white pixel area;
a gate line and a data line on the substrate;
a thin film transistor connected to each of the gate line and the data line;

a first insulating layer on the gate line, the data line, and the thin film transistor;

a second insulating layer on the first insulating layer, the second insulating layer having apertures in the red pixel area, the green pixel area, and the blue pixel area, respectively;

a reflective layer on the first insulating layer and the second insulating layer, the reflective layer being in the red pixel area, the green pixel area, and the blue pixel area;

a color filter in each of the apertures;

an opaque pixel electrode in the white pixel area; and a transparent pixel electrode on each color filter and the second insulating layer, the transparent pixel electrode being connected to the thin film transistor.

10. The display device as claimed in claim 9, wherein the reflective layer is between the color filter and the first insulating layer.

11. The display device as claimed in claim 10, wherein the opaque pixel electrode is spaced apart from the reflective layer.

12. The display device as claimed in claim 11, wherein the opaque pixel electrode and the reflective layer include a same material.

13. The display device as claimed in claim 12, wherein the transparent pixel electrodes are in the red pixel area, the green pixel area, and the blue pixel area, respectively.

14. The display device as claimed in claim 10, wherein the reflective layer is in the white pixel area.

15. The display device as claimed in claim 10, wherein the substrate further comprises a light shielding area surrounding the red pixel area, the green pixel area, the blue pixel area, and the white pixel area, and overlapping the gate line and the data line.

16. The display device as claimed in claim 15, wherein the reflective layer is in the light shielding area.

\* \* \* \* \*